Figure 1:
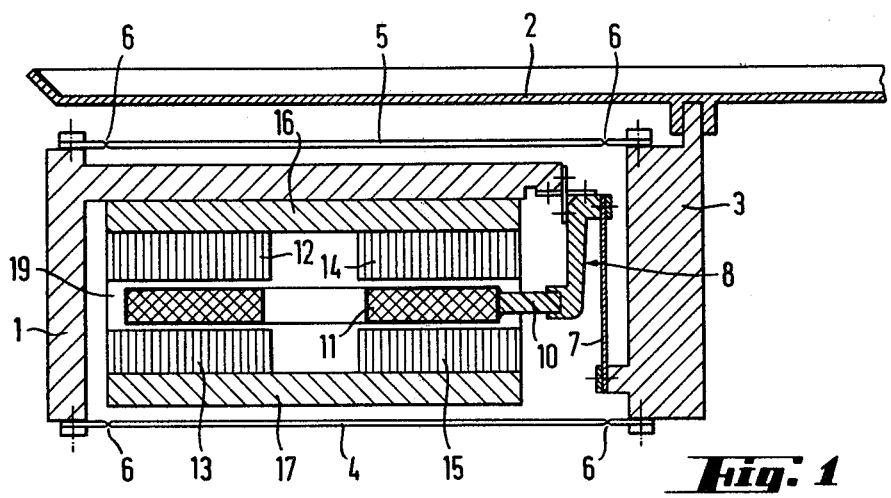

United States Patent [19]

Knothe et al.

[11] 4,382,480

[45] May 10, 1983

[54] WEIGHING MACHINE WITH FLAT MAGNETS FOR ELECTROMAGNETIC TORQUE COMPENSATION

[75] Inventors: Erich Knothe, Bovenden; Christoph Berg, Adelebsen; Franz-Josef Melcher, Hardegsen, all of Fed. Rep. of Germany

[73] Assignee: Sartorius GmbH, Fed. Rep. of Germany

[21] Appl. No.: 283,035

[22] Filed: Jul. 13, 1981

[30] Foreign Application Priority Data

Jul. 31, 1980 [DE] Fed. Rep. of Germany ....... 3029060

[51] Int. Cl.³ .......................... G01G 7/00; G01G 3/14
[52] U.S. Cl. .............................. 177/212; 177/210 EM
[58] Field of Search ......................... 177/210 EM, 212

[56] References Cited

U.S. PATENT DOCUMENTS

| 3,955,638 | 5/1976 | Wasko | 177/212 |
| 4,148,370 | 4/1979 | Luchinger et al. | 177/212 X |
| 4,300,647 | 11/1981 | Knothe et al. | 177/212 |
| 4,311,202 | 1/1982 | Kunz | 177/212 |

FOREIGN PATENT DOCUMENTS 2254394 5/1974 Fed. Rep. of Germany ...... 177/212

*Primary Examiner*—George H. Miller, Jr.
*Attorney, Agent, or Firm*—Eric P. Schellin

[57] ABSTRACT

A weighing machine employing electromagnetic forces having a weighing pan which is mounted at the top portion thereof. An electromagnetic coil is employed in an air gap of a stationary permanent magnet system for generating a compensating force. The coil has a rectangular shape while the permanent magnet system consists of rectangular plates of magnetically active material with the vertical direction of magnetism being above or below the longer sides of the coil. A horizontal compensating force results.

10 Claims, 5 Drawing Figures

WEIGHING MACHINE WITH FLAT MAGNETS FOR ELECTROMAGNETIC TORQUE COMPENSATION

The invention relates to a weighing machine on the principle of the electromagnetic force compensation with a weighing pan, mounted with the pan on top, for the reception of the weighed stock and a movable coil, which is flowed through by current, is disposed in the air gap of a stationary permanent magnet system and generates the compensating force.

Weighing machines of this kind are known and described in their usual construction for example in the U.S. Pat. No. 4,062,416. In that case, the permanent magnet system is constructed in cylindrical shape and generates a horizontally extending, radially symmetrical magnetic field, into which a coil enters with vertical axis so that a vertical compensation force results, which compensates directly for the perpendicular weight force of the weighing stock. Even in the case of weighing machines with lever transmission (for example DE-OS NO. 28 53 074), the permanent magnet system is usually of cylindrical shape and generates a vertical compensating force.

The cylindrical shape however results in a relatively great overall height, which is given by the height of the magnetically active material and the thickness of the pole plates on both sides, for the permanent magnet system. This overall height determines the minimum height of the weighing machine. This height is critical particularly in the case of directly compensating weighing machines with a parallel guidance of guide rods, since the guide rods must be accommodated additionally above and below the permanent magnet system. Besides that, the cylindrical shape is unfavourable in terms of production technique for materials, such as the magnetically active materials, which do not let themselves be machined by cutting operations.

It is furthermore known from the U.S. Pat. No. 3,322,222 to utilize an approximately rectangular coil with horizontal axis. In that case, the upper and lower side of the coil is disposed in the horizontally extending magnetic field of two C-shaped permanent magnets so that a vertical compensating force is generated directly. A relatively great overall height results also in this case. Beyond that, the production of C-shaped permanent magnets is expensive.

It is therefore the task of the invention so to develop a weighing machine on the principle of the electromagnetic force compensation that the permanent magnet system can be constructed to be particularly flat. Furthermore, it is a task of the invention to state a shape for the permanent magnet system, which can be manufactured cheaply. Furthermore, it is a task of the invention to state a permanent magnet system which displays a reduced or small temperature co-efficient.

This problem is solved according to the invention thereby, that the coil has approximately a rectangular shape, that the permanent magnet system consists of rectangular plates of magnetically active material with vertical direction of magnetisation above or/and below the longer sides of the coil and of a soft iron short-circuit, whereby a horizontal compensating force results, and that means for force deflection are provided between coil and weighing pan.

Due to the build-up of the permanent magnet system from rectangular plates of magnetically active material, these parts can be produced cheaply and without waste (scrap) by simple sawing. This is particularly important for the reason that these materials (for example cobalt-samarium alloys) are expensive and do not let themselves be processed easily. The approximately likewise rectangular shape of the coil results in an optimum utilisation of the magnetic field for compensating force generation.

Due to the division of the magnetically active material into two plates associated with both the longer sides of the rectangular coils, the overall height caused by the magnetically active magnet material is reduced to half compared with a conventional cylinder magnet. In that case, it does not matter whether both the plates are each disposed above or below the coil or whether both the plates are divided up once again so that altogether four plates are present above and below the longer sides of the rectangular coil.

If the soft iron short-circuit of the permanent magnet system in a preferred embodiment is likewise produced from rectangular plates in the shape of a box open at the front and the rear, then also these plates let themselves be produced simply and cheaply by sawing.

Expediently, the coil is constructed to be as flat as possible, i.e. with the least possible winding width at great winding height. Thus, the air gap for the coil can be kept smallest for the same number of turns and the same wire cross-section so that also the total overall height of the permanent magnet system remains least.

In order to compensate for the vertical weight force of the weighing stock by the horizontal, electromagnetically produced compensating force, a force deflection is necessary. This force deflection is advantageously so constructed that it effects a force gearing at the same time so that already a small electromagnetically produced compensating force can hold the balance of a great weight force. Thereby, the electrical current in the coil and the magnetic field of the permanent magnet system can be kept correspondingly small. In an expedient refinement, the force deflection is attained through an angle lever.

Should an easy adjustability of the strength of the magnetic field be possible, then it is advantageous to retain the one plate of the soft iron short-circuit by adjusting screws and thus to be able to bring the field strength to the desired value by slight variation of the air gap. In that case, it is likewise possible through expedient choice of the free length of the screws and their material to at least approximately compensate for the temperature-dependence of the remanence of the magnetically active material through the temperature-dependent variation of the width of the air gap given by the different thermal co-efficient of expansion of the screw material.

Figure 2:
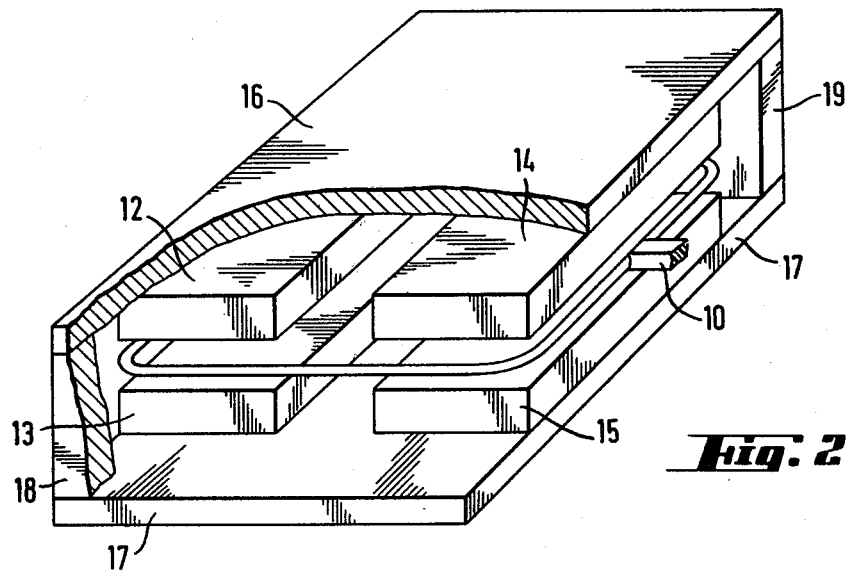
Figure 3:
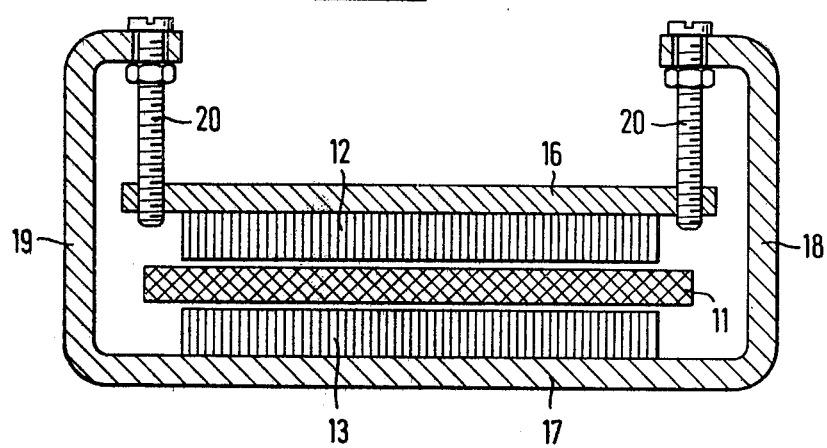

The invention is described in the following by reference to the schematic figures. In that case, there show:

FIG. 1 in section, a side elevation of the parts of the weighing machine essential to the invention, FIG. 2 a perspective illustration of the permanent magnet system, wherein only one turn is symbolically illustrated as coil, FIG. 3 a section through a special refinement of the permanent magnet system and FIG. 4 coil and permanent magnet for a round coil (part a) and an approximately rectangular coil (part b) in comparison.

The weighing machine shown in FIG. 1 consists of a support part, which is firmly connected with the not shown housing. Fastened to this support part 1 are two guide rods 4 and 5, which in the form of a parallel guidance movably guide the connecting part 3 with the weighing pan 2 vertically. The guide rods 4 and 5 are either elastic over their entire length or possess elastic constrictions at the places characterized by 6 and are stiff over their remaining length. The weight force transmitted by the weighing stock onto the weighing pan 2 and the connecting part 3 is transmitted through a coupling tape 7 onto the short lever arm of an angle lever 8. The angle lever 8 is borne on the support part 1 by a cross tape joint 9. The coil 11 is fastened to an insulated projection 10 on the long lever arm of the angle 8. As indicated by one turn in perspective in FIG. 2, it is wound in rectangular shape with rounded corners and self-supporting without coil body. It is disposed between the poles of a permanent magnet system consisting of four rectangular plates 12 to 15 of the magnetically active material and two plates 16 and 17 of soft iron as short-circuit. Both the plates 16 and 17 of soft iron are retained by two lateral webs 18 and 19 (FIG. 2). The entire permanent magnet system 12 to 19 is likewise fastened to the support part 1. The magnetically active material is magnetized in vertical direction, the polarity for example being so that both the plates 12 and 13 each have the magnetic north pole at their underside, while both the plates 14 and 15 have the magnetic north pole at their upper side. The magnetic field lines in this example thus extend from the active plate 12 through the part of the coil 11 at the left in FIG. 1, through the active plate 13, further through the soft iron plate 17, through the active plate 15, then through the part of the coil 11 at the right in FIG. 1, then through the active plate 14 and through the soft iron plate 16 back to the active plate 12. Both the longer sides of the rectangular coil 11 are thus permeated by a vertical magnetic field so that a current in the coil 11 generates a horizontal force. This horizontal force engages through the projection 10 at the longer lever arm of the angle lever 8 and there holds the equilibrium of the weighing force, engaging at the shorter lever arm, of the weighing stock. The details of the associated electronic system with position sensor and regulating amplifier are familiar from the known weighing machines with electromagnetic force compensation so that a description can here be dispensed with.

The coil 11 is so wound that only few turns lie beside one another, but many layers above one another. Thereby, the spacing between the magnetically active plates 12 and 13 or 14 and 15 of the permanent magnet system can be kept small, which for one thing favors a small overall height of the system and for the other thing meets the magnetic requirement for a small air gap of large cross-section.

Figure 4A:
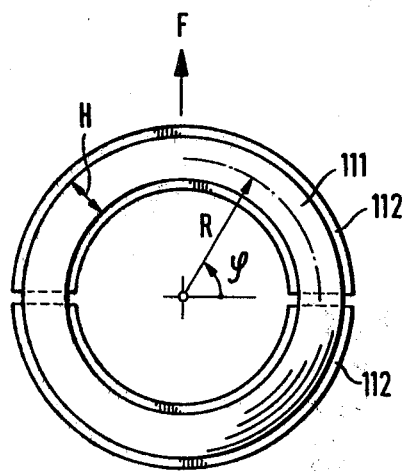
Figure 4B:
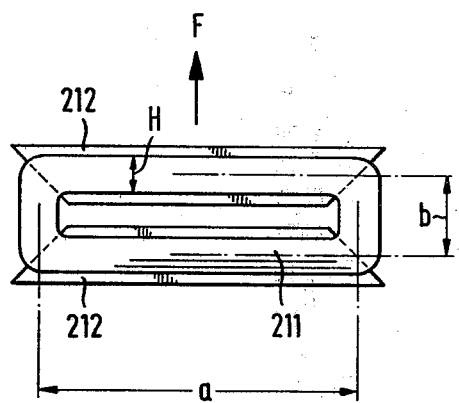

Although the about rectangularly shaped coil is more expensive in its manufacture than a round coil, it however results for the same force production in a saving in magnet and coil material and in electrical power (heat loss!), as shall be explained in the following by reference to the FIGS. 4a and 4b:

A round coil (111 in FIG. 4a) of the mean radius R, a winding height H and a winding number n in a magnetic field B at a current I generates a force F of the magnitude:

$$F = \int B \cdot I \cdot \sin\phi \cdot dl =$$

-continued
$$B \cdot I \cdot 2 \cdot n \cdot R \cdot \int_0^\pi \sin\phi \cdot d\phi = B \cdot I \cdot 4 \cdot n \cdot R.$$

The overall length L of the wire in that case is:

$$L = 2 \cdot \pi \cdot R \cdot n$$

and the required area S of the magnets 112 is:
$$S = 2 \cdot \pi \cdot R \cdot H.$$

A rectangular coil (221 in FIG. 4b) with the mean side lengths a and b, a winding height H and a winding number n in a magnetic field B at a current I generates a force F of the magnitude:

$$F = B \cdot I \cdot 2 \cdot a \cdot n.$$

The overall length L of the wire in that case is:

$$L = 2 \cdot (a+b) \cdot n$$

and the required area S of the magnets 212 is:

$$S = 2 \cdot a \cdot H.$$

if one now chooses the longer side a of the rectangular coil to be equal to the diameter of the round coil, thus $a = 2 \cdot R$ and furthermore $b = a/3$, then a comparison of the formulas shows that the generated force F is equal in both cases, but that the required magnet area in the case of the rectangular coil only amounts to the fraction $2/\pi = 0.64$ of the required magnet area in the case of the round coil and that the overall length of the coil wire in the rectangular coil attains only the fraction $8/3\pi = 0.85$ of the overall length of the coil wire in the case of the round coil. The material expenditure for the active part of the magnet and for the compensating coil is thus less for a rectangular shape of the coil than for a round shape. The shorter wire length in the case of the rectangular coil beyond that leads to a lower electrical resistance of the coil and thus to a lower electrical loss power.

The length a of the rectangular coil can for one thing be somewhat greater than the corresponding length of the plate of magnetically active material. The length of the coil effective for the force generation is then given by the plate of magnetically active material so that length changes of the coil, for example by reason of load-dependent electrical heating, and assembly tolerances have no influence to a first approximation. The length a of the rectangular coil can for the other thing also be somewhat smaller than the corresponding length of the plate of magnetically active material. Then, the coil determines the effective length for the force generation and a temperature-caused change in the coil length leads to a corresponding change in force for the same coil current. This can for example in weighing machines of higher resolution be drawn upon for temperature compensation of the permanent magnet system. The remanence of the active material and thereby the magnetic field intensity in the air gap of the permanent magnet system reduces at increasing temperature, the coil length effective for force generation increasing at increasing temperature by reason of the thermal expansion. It is in that case of course a presupposition that the lost heat converted in the coil is made independent of load, which can for example be attained by the means stated in the DE-OS 30 02 462 so that the temperature of the coil changes only with the ambient temperature.

A complete temperature compensation lets itself be attained by the refinement of the permanent magnet system according to FIG. 3: Both the lateral webs 18 and 19 do not support the upper soft-magnetic short-circuit 16 directly, but are drawn further up and carry the soft-magnetic short-circuit 16 through adjusting screws 20. With the aid of these adjusting screws 20, an easy adjustability of the air gap for the coil 11 is attained for one thing and the material of the adjusting screws 20 can for the other thing be so chosen that the screw length increases more strongly with temperature than the length of the drawn-up part of the soft-magnetic short-circuit 18 and 19 so that the air gap becomes somewhat smaller at increasing temperature. For example, aluminium has a greater thermal co-efficient of expansion than soft iron. With correct dimensioning of the free length of the adjusting screws 20, this temperature-dependent width of the air gap can just balance the remanence, reducing with temperature, of the active magnetic material.

The remaining details of this permanent magnet system and of the associated coil correspond to those in FIGS. 1 and 2.

What is claimed is:

1. Weighing machine on the principle of the electromagnetic force compensation with a weighing pan, mounted with the pan on top, for the reception of the weighed stock and a movable coil, which is flowed through by current, is disposed in the air gap of a stationary permanent magnet system and generates the compensating force, characterized thereby, that the coil has approximately a rectangular shape, that the permanent magnet system consists of rectangular plates of magnetically active material with vertical direction of magnetisation above and below the longer sides of the coil and of a soft iron short-circuit whereby a horizontal compensating force results, and that means for force deflection are provided between coil and weighing pan.

2. The weighing machine according to claim 1, wherein the means for force deflection are so constructed that they effect a force gearing at the same time.

3. The weighing machine according to claim 1, wherein the means for force deflection comprise an angle lever.

4. The weighing machine according to claim 1, wherein the coil is constructed as flat coil, wherein the width of the winding is less than the height of the winding by at least the factor 2.

5. The weighing machine according to claim 4, wherein the means for force deflection are so constructed that they effect a force gearing at the same time.

6. The weighing machine according to claim 1, wherein at least one plate of the soft iron short-circuit is retained by adjusting screws.

7. The weighing machine according to claim 6, wherein the free length of the adjusting screws together with the material thereof is so chosen that the temperature-dependent change, given by the co-efficient of thermal expansion, of the width of the air gap at least approximately compensates for the temperature-dependence of the remanence of the magnetically active material.

8. The weighing machine according to claim 1, wherein the soft iron short-circuit is constructed to be box-shaped with open front and rear sides.

9. The weighing machine according to claim 8, wherein the coil is constructed as flat coil, wherein the width of the winding is less than the height of the winding by at least the factor 2.

10. The weighing machine according to claim 8, wherein the means for force deflection are so constructed that they effect a force gearing at the same time.

* * * * *